United States Patent
Brasnett et al.

(10) Patent No.: US 8,699,851 B2
(45) Date of Patent: Apr. 15, 2014

(54) VIDEO IDENTIFICATION

(75) Inventors: Paul Brasnett, Surbiton (GB); Stavros Paschalakis, Guildford (GB); Miroslaw Bober, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 618 days.

(21) Appl. No.: 12/693,220

(22) Filed: Jan. 25, 2010

(65) Prior Publication Data

US 2010/0189409 A1 Jul. 29, 2010

(30) Foreign Application Priority Data

Jan. 26, 2009 (GB) .................................. 0901262.6

(51) Int. Cl.
 *H04N 9/80* (2006.01)
(52) U.S. Cl.
 USPC .......................................................... 386/241
(58) Field of Classification Search
 None
 See application file for complete search history.

(56) References Cited

U.S. PATENT DOCUMENTS

| | | | | |
|---|---|---|---|---|
| 2003/0020743 | A1* | 1/2003 | Barbieri ........................ | 345/719 |
| 2006/0093215 | A1* | 5/2006 | Paschalakis et al. .......... | 382/173 |
| 2006/0210176 | A1* | 9/2006 | Kajiwara et al. ............. | 382/232 |
| 2007/0253594 | A1 | 11/2007 | Lu et al. | |

FOREIGN PATENT DOCUMENTS

| | | |
|---|---|---|
| EP | 1 640 913 A1 | 3/2006 |
| EP | 1 640 914 A2 | 3/2006 |
| JP | 2006-135938 A | 5/2006 |
| JP | 2008-282316 A | 11/2008 |
| WO | WO-2008/044026 A1 | 4/2008 |

OTHER PUBLICATIONS

Chum et al., "Scalable Near Identical Image and Shot Detection", *Proc of the 6th ACM Int'l Conf on Image and Video Retrieval*, Amsterdam, Netherlands, pp. 549-556 (2007).
Hoad et al., "Fast Video Matching with Signature Alignment", *Proc of 5th ACM SIGMM Int'l Wkshp on Multimedia Info Retrieval*, Berkley, CA,, pp. 262-269 (2003).
Hoad et al., "Video Similarity Detection for Digital Rights Management.", *Proc of AU Computer Science Conf.* Adelaide, AU, pp. 237-245 (2003).
Samet, H., *Foundations of Multidimentional and Metric Data Structures*, Ed. Morgan Kaufmann, Sec 4.7.4, pp. 711-716 (2006).

(Continued)

*Primary Examiner* — Huy T Nguyen
(74) *Attorney, Agent, or Firm* — Birch, Stewart, Kolasch & Birch, LLP

(57) ABSTRACT

A method and apparatus for processing a first sequence of images and a second sequence of images to compare the first and second sequences is disclosed. Each of a plurality of the images in the first sequence and each of a plurality of the images in the second sequence is processed by (i) processing the image data for each of a plurality of pixel neighborhoods in the image to generate at least one respective descriptor element for each of the pixel neighborhoods, each descriptor element comprising one or more bits; and (ii) forming a plurality of words from the descriptor elements of the image such that each word comprises a unique combination of descriptor element bits. The words for the second sequence are generated from the same respective combinations of descriptor element bits as the words for the first sequence. Processing is performed to compare the first and second sequences by comparing the words generated for the plurality of images in the first sequences with the words generated for the plurality of images in the second sequence.

29 Claims, 5 Drawing Sheets

(56) References Cited

OTHER PUBLICATIONS

Sivic et al., "Efficient Visual Search for Objects in Videos", *Proc of the IEEE*, 96:4:548-566 (Apr. 2008).
Van Ginkel et al., "A Short Introduction to the Radon and Hough Transfoms and How They Relate to Each Other", Quantative Imageing Grp Tech Report Series, Delft Univ of Tech #Qi-2004-01 (2004).
Kashino et al., "A Quick Search Method for Audio and Video Signals Based on Histogram Pruning", IEEE Transactions on Multimedia, vol. 5, No. 3, Sep. 2003, pp. 348-357, XP-001189754.
Oostveen et al., "Feature Extraction and a Database Strategy for Video Fingerprinting", Lecture Notes in Computer Science/Computational Science, vol. 2314, Mar. 11, 2002, pp. 117-128, XP009017770.
Japanese Preliminary Notice of Reasons for Rejection for Japanese Application No. 2010-014279, dated Nov. 19, 2013.

* cited by examiner

| Word | Frame Number of First Occurrence | Binary Representation |
|---|---|---|
| $w_\alpha$ | $\omega_0$ | $\tilde{\omega}_0 = \begin{cases} 0 & \omega_0 < \omega_1 \\ 1 & otherwise \end{cases}$ |
| $w_{\alpha+1}$ | $\omega_1$ | $\tilde{\omega}_1 = \begin{cases} 0 & \omega_1 < \omega_2 \\ 1 & otherwise \end{cases}$ |
| ⋮ | ⋮ | ⋮ |
| $w_\zeta$ | $\omega_{z-1}$ | $\tilde{\omega}_{z-1} = \begin{cases} 0 & \omega_{z-1} < \omega_0 \\ 1 & otherwise \end{cases}$ |

FIG. 3

VIDEO IDENTIFICATION

CROSS-REFERENCE TO RELATED APPLICATION

This application claims the right of priority based on British patent application number 0901262.6 filed on 26 Jan. 2009, which is hereby incorporated by reference herein in its entirety as is fully set forth herein.

FIELD OF THE INVENTION

The invention relates to a method, apparatus and computer program product for fast and reliable video identification that is robust to common editing operations such as camera capture, analogue/digital conversion, recompression, etc.

BACKGROUND TO THE INVENTION

A rapidly increasing number of videos are being stored by professionals and consumers. For professionals, the cost and technical difficulties of creating, storing and editing video content have been decreasing. For consumers the increase in choice and decrease in cost of set-top boxes, personal video recorders, video cameras and computers has driven an increase in video content. Over the past couple of years there has been an explosion in both legal and illegal content available on the Internet. The ability to index, search and monitor this content has become an increasingly important problem. The MPEG-7 standard was an early work in the area of content based search and retrieval. An area lacking in the original version of the standard is near-duplicate video detection.

Near duplicate video detection can be defined as follows: given a query video sequence, find all of the duplicates in a database. The notion and interpretation of (near-)duplicates varies. However, for this invention a duplicate is regarded as a sequence that has been created by using common video editing/processing operations on an original. Examples of such operations include colour change, compression, transcoding, format change, frame rate change, analogue VCR recapture and camera recapture amongst many more. The present invention also addresses the problem that the duplicate part may form only a part of the query sequence.

In previous work in the area [T. Hoad and J. Zobel. Video similarity detection for digital rights management. In Proceedings of Australasian Computer Science Conference, pages 237-245, Adelaide, Australia, 2003.] shot cuts and boundaries were used to form a signature of a video sequence. This provides a very compact representation of a video, but it performs very poorly on short sequences and is very sensitive to the shot-detection algorithm used [T. Hoad and J. Zobel., Proceedings of the 5th ACM SIGMM international workshop on Multimedia information retrieval, pages 262-269, Berkeley, US, 2003.]

A typical state-of-the-art feature-point approach to (near-)duplicate detection in video is given in [J. Sivic, A. Zisserman, Efficient Visual Search for Objects in Videos, Proceedings of the IEEE, April 2008, 96 (4), pages 548-566.] and can be outlined as i) detect key frames ii) detect key-points in the frame, iii) extract features from regions around the point, iv) match sequences using features, v) apply test for spatial cohesion of objects in sequences. There are a number of weaknesses with the approach outlined. Firstly the use of key frames means the method is likely to perform less well on short clips. The extraction of features (iii) is a computationally expensive method and results in large storage requirements. For step (iv) a visual vocabulary is used which is learned from clustering data. This can lead to over-fitting to a particular dataset with failure to generalise. Related methods such as [Ondřej Chum, James Philbin, Michael Isard and Andrew Zisserman, Scalable near identical image and shot detection, Proceedings of the 6th ACM international conference on Image and video retrieval, pages 549-556, Amsterdam, The Netherlands, 2007] provide fast searching at the cost of high memory requirements for the hash tables used. Whilst this may be suitable for some scenarios it is not suitable in consumer electronics environments where memory resources are typically very limited.

The present invention aims to address at least one or more of the limitations of such prior art methods.

SUMMARY OF THE INVENTION

Certain aspects of the present invention are set out in the accompanying claims. Other aspects are described in the embodiments below and will be appreciated by the skilled person from a reading of this description.

By way of summary, the present invention provides an apparatus operable to process a first sequence of images and a second sequence of images to compare the first and second sequences, the apparatus comprising: a descriptor element generator operable to process each of a plurality of the images in the first sequence and each of a plurality of the images in the second sequence by processing the image data for each of a plurality of pixel neighbourhoods in the image to generate at least one respective descriptor element for each of the pixel neighbourhoods, each descriptor element comprising one or more bits; a word generator operable to generate a plurality of words from the descriptor elements of each image such that each word comprises a unique combination of descriptor element bits, wherein the word generator is arranged to generate the words for the second sequence from the same respective combinations of descriptor element bits as the words for the first sequence; and a word comparer operable to compare the first and second sequences by comparing the words generated for the plurality of images in the first sequences with the words generated for the plurality of images in the second sequence.

The word comparer may be arranged to compare the first and second sequences by comparing the frequency of occurrence of different word values in the first and second sequences.

The word comparer may comprise: an occurrence data generator operable to determine the number of occurrences of each possible word value for each word in the first sequence to generate occurrence data for the first sequence and operable to determine the number of occurrences of each possible word value for each word in the second sequence to generate occurrence data for the second sequence; and an occurrence data comparer operable to compare the occurrence data for the first sequence with the occurrence data for the second sequence.

The occurrence data comparer may be arranged to compare the occurrence data for the first sequence and the occurrence data for the second sequence to generate a respective comparison result for each word, and to merge the respective comparison results to generate an overall comparison result.

The apparatus may further comprise: a word value identifier operable to identify, for each word, the word values that occur in both sequences; a temporal order identifier operable to identify, for each word, the temporal order of occurrence of the word values in both sequences; and a temporal order comparer operable to compare the temporal orders of occurrence.

The apparatus may further comprise: a matching image pair identifier operable to identify matching pairs of images, each pair of images comprising an image from the first sequence and an image from the second sequence; and a correspondence tester operable to perform a further correspondence test to determine a similarity between at least one identified pair of images.

The present invention also provides an apparatus operable to process image data defining an image to generate at least one value representative of the image, the apparatus comprising: a descriptor element generator operable to process the image data for each of a plurality of pixel neighbourhoods in the image to generate at least one respective descriptor element for each of the pixel neighbourhoods, each descriptor element comprising one or more bits; and a word generator operable to generate at least one word from the descriptor elements such that each word comprises one or more bits from one or more descriptor elements and such that the total number of bits in all of the words is less than the total number of bits in all of the descriptor elements.

The present invention also provides an apparatus operable to process image data defining an image to generate a plurality of values representative of the image, the apparatus comprising: a descriptor element generator operable to process the image data for each of a plurality of pixel neighbourhoods in the image to generate at least one respective descriptor element for each of the pixel neighbourhoods, each descriptor element comprising one or more bits; and a word generator operable to generate a plurality of words from the descriptor elements such that each word comprises a unique combination of descriptor element bits.

The apparatus may further comprise a quantiser operable to quantise each descriptor element; and the word generator may be arranged to generate each word from the quantised descriptor elements.

The quantiser may be arranged to quantise each descriptor element to form a respective one bit binary result.

The descriptor element generator may be arranged to generate the descriptor elements for the image at a plurality of different pixel resolutions; and the word generator may be arranged to generate at least one word by combining one or more bits from descriptor elements generated at different pixel resolutions.

The present invention also provides an apparatus operable to process image data defining an image to generate at least one value representative of the image, the apparatus comprising: a descriptor element generator operable to process the image data for each of a plurality of pixel neighbourhoods in the image to generate at least one respective descriptor element for each of the pixel neighbourhoods, each descriptor element comprising one or more bits; a quantiser operable to quantise each descriptor element; and a representative value generator operable to generate at least one value representative of the image from the quantised descriptor elements.

The quantiser may be arranged to quantise each descriptor element to form a respective one bit binary result.

The present invention also provides an apparatus operable to process image data defining a sequence of images to generate and store a representation of the sequence, the apparatus comprising: a descriptor element generator operable to process, for each image in the sequence, the image data for each of a plurality of pixel neighbourhoods in the image to generate at least one respective descriptor element for each of the pixel neighbourhoods, each descriptor element comprising one or more bits; a word generator operable to generate, for each image in the sequence, at least one word from the descriptor elements of the image such that each word comprises one or more bits from one or more descriptor elements and such that the total number of bits in all of the words of the image is less than the total number of bits in all of the descriptor elements of the image; a histogram generator operable to generate histogram data defining which words appear in the sequence of images and how many times; and a data writer operable to write the histogram data, words and descriptor elements for the images in the sequence to storage.

The apparatus may further comprise a descriptor element quantiser operable to quantise each descriptor element; and the word generator may be arranged to form each word from the quantised descriptor elements. In addition, the apparatus may further comprise a histogram quantiser operable to quantise the histogram data, and the data writer may be arranged to write the quantised histogram data, words and quantised descriptor elements to storage.

The apparatus may be operable to process a sequence of images comprising a fragment of a video sequence.

The data writer may be arranged to store the histogram data, words and descriptor elements in the bitstream.

The present invention also provides an apparatus operable to process image data defining a sequence of images to generate and store a representation of the sequence, the apparatus comprising: a descriptor element generator operable to process, for each image in the sequence, the image data for each of a plurality of pixel neighbourhoods in the image to generate at least one respective descriptor element for each of the pixel neighbourhoods, each descriptor element comprising one or more bits; a word generator operable to generate, for each image in the sequence, a plurality of words from the descriptor elements of the image such that each word comprises a unique combination of descriptor element bits; a histogram generator operable to generate histogram data defining which words appear in the sequence of images and how many times; and a data writer operable to write the histogram data, words and descriptor elements for the images in the sequence to storage.

The apparatus may further comprise a descriptor element quantiser operable to quantise each descriptor element; and the word generator may be arranged to form each word from the quantised descriptor elements. In addition, the apparatus may further comprise a histogram quantiser operable to quantise the histogram data, and the data writer may be arranged to write the quantised histogram data, words and quantised descriptor elements to storage.

The apparatus may be operable to process a sequence of images comprising a fragment of a video sequence.

The data writer may be arranged to store the histogram data, words and descriptor elements in the bitstream.

The present invention also provides an apparatus operable to process image data defining a sequence of images to generate and store a representation of the sequence, the apparatus comprising: a descriptor element generator operable to process, for each image in the sequence, the image data for each of a plurality of pixel neighbourhoods in the image to generate at least one respective descriptor element for each of the pixel neighbourhoods, each descriptor element comprising one or more bits; a descriptor element quantiser operable to quantise each descriptor element; a representative value generator operable to generate, for each image in the sequence, at least one value representative of the image from the quantised descriptor elements; a histogram generator operable to generate histogram data defining which values representative of the images appear in the sequence of images and how many times; a histogram quantiser operable to quantise the histogram data; and a data writer operable to write the quantised histogram data, values representative of the images and quantised descriptor elements to storage.

The apparatus may be operable to process a sequence of images comprising a fragment of a video sequence.

The data writer may be arranged to store the histogram data, values representative of the images and descriptor elements in the bitstream.

An embodiment of the present invention provides a new method and apparatus for video identification, which
provides a very compact representation of video sequences,
does not depend upon training data,
provides very fast searching and matching,
is robust to common editing/processing operations
and provides accurate localisation of matching frame positions.

LIST OF FIGURES

Embodiments of the invention will now be described, by way of example only, with reference to the accompanying drawings, in which:

FIG. 3 illustrates binarisation in an embodiment;

EMBODIMENTS OF THE INVENTION

A method that is performed by a processing apparatus in an embodiment of the invention will now be described. The method comprises a number of processing operations. As explained at the end of the description, these processing operations can be performed by a processing apparatus using hardware, firmware, a processing unit operating in accordance with computer program instructions, or a combination thereof.

Consider a sequence of video frames $f_i(c,x,y)$ where i is the frame index, e.g. $i \in [0,T-1]$ where T is the total number of frames in the sequence, c is an index in l colour channels, e.g. $c \in \{Y,U,V\}$ with l=3, and x and y are spatial coordinates, e.g. $x \in [0,M-1]$, $y \in [0,N-1]$ where M and N is the horizontal and vertical frame resolution respectively.

In a preferred embodiment of the invention, we describe each frame in terms of its pixel intensities and differences. Such descriptors are described in our co-pending patent applications EP 1 640 913 and EP 1 640 914, incorporated in their entirety herein by reference. In a preferred embodiment of the invention, we consider spatially resampled frames of m×m pixel resolution, where m is a power of 2. Preferably m is a small value, e.g. m=16 or m=32, although this is not restrictive. Each frame is then divided in non-overlapping 2×2 pixel neighbourhoods and descriptor elements are computed in each neighbourhood as $$\overset{m}{d_i}(c, p, q) = \left( \begin{array}{c} f_i(c, p, q) + f_i(c, p+1, q) + \\ f_i(c, p+1, q+1) + f_i(c, p, q+1) \end{array} \right) / 4 \quad (1)$$

$$\overset{m}{d_i}(c, p+1, q) = (f_i(c, p, q) - f_i(c, p+1, q))/2 \quad (2)$$

$$\overset{m}{d_i}(c, p+1, q+1) = (f_i(c, p+1, q) - f_i(c, p+1, q+1))/2 \quad (3)$$

$$\overset{m}{d_i}(c, p, q+1) = (f_i(c, p+1, q+1) - f_i(c, p, q+1))/2 \quad (4)$$

Figure 1:
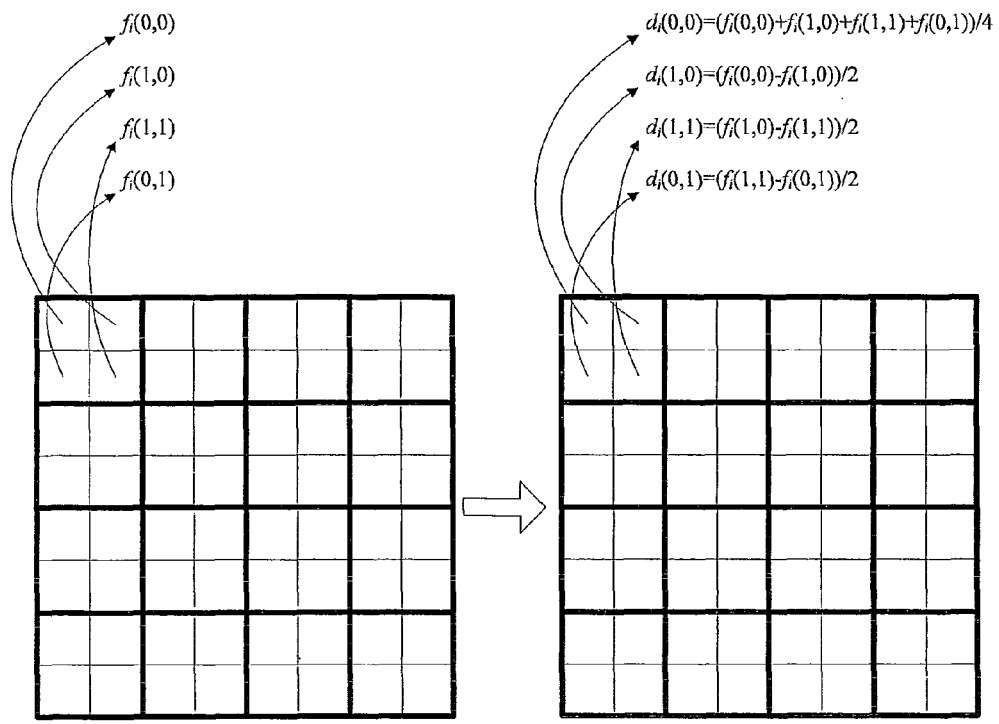
FIG. 1 illustrates the processing to generate descriptor elements in an embodiment.

This is illustrated in FIG. 1 for m=8 and c=Y and without loss of generality. The descriptor elements according to eq. (1) are average intensities and, taken for the whole frame, give a resampled version of that frame at (m/2)×(m/2) pixel resolution, which is re-processed according to eq. (1)-(4). This process continues until the average intensity for the whole frame is calculated. The complete descriptor for the frame $f_i$ therefore contains descriptor elements for the frame at different pixel resolutions (that is, m×m, m/2×m/2, ..., 4×4, 2×2) and is then given by $$d_i = \left\{ \overset{2}{d_i}, \overset{4}{d_i}, K, \overset{m/2}{d_i}, \overset{m}{d_i} \right\}.$$

In a preferred embodiment of the invention, frames are represented by their luminance channel Y and the descriptor $d_i$ is extracted from this luminance information.

Optionally, the descriptor elements are quantised to a desired number of bits, which may vary for different elements, colour channels, etc. In a preferred embodiment of the invention, the descriptor elements are binarised as follows $$\underset{AVG}{\tilde{d}_i} = \begin{cases} 1 & \text{if } \underset{AVG}{d_i} \geq r/2 \\ 0 & \text{otherwise} \end{cases} \quad (5)$$

where r is the dynamic range, e.g. r=256 for 8-bit pixel values $$\underset{DIFF}{\tilde{d}_i} = \begin{cases} 1 & \text{if } \underset{DIFF}{d_i} \geq 0 \\ 0 & \text{otherwise} \end{cases} \quad (6)$$

where $$\underset{AVG}{d_i} \text{ and } \underset{DIFF}{d_i}$$

denote averages according to eq. (1) and differences according to eq. (2)-(4) respectively. The advantage of (5) and (6) is that they may be implemented so that they become equivalent to retaining the MSB (Most Significant Bit) of the binary representation of the integer part of the elements.

In alternative embodiments, other quantisation/binarisation techniques may also be employed, such as locality sensitive hashing. This method is not examined here but is described in Samet H., "Foundations of Multidimensional and Metric Data Structures", Morgan Kaufmann, 2006.

Figure 2:
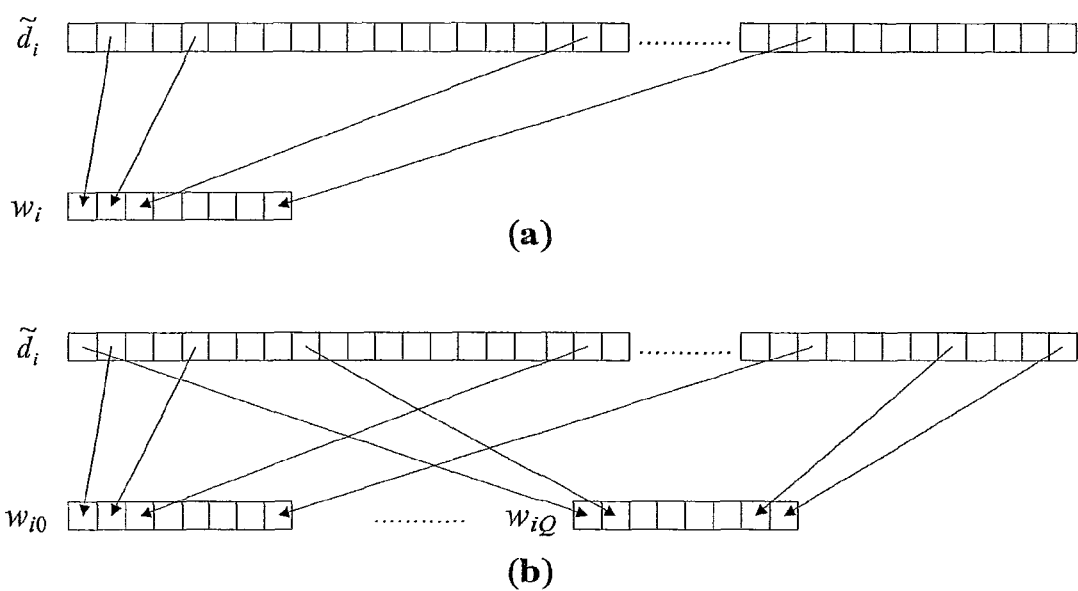
FIGS. 2a and 2b illustrate the processing to generate words from the descriptor elements in an embodiment.

The complete descriptor for the frame is then used to form at least one compact word based on one or more bits of one or more of its descriptor elements. This is illustrated in FIG. 2a. It should be noted that the term "word" used herein refers to a word that may have any number of bits and is not specifically restricted to a particular number of bits as in some computing literature. More specifically, in a preferred embodiment of the invention, a small ordered set of elements in the binarised $\tilde{d}_i$ is concatenated to produce a word. There is no restriction on which elements to choose and a word may mix elements from different colour channels, from different levels of coarseness, e.g. extracted at 16×16 or 4×4 resolution, be they averages according to eq. (1) or differences according to eq. (2)-(4). For example, in one embodiment of the invention, elements may be chosen randomly among all the available elements. In another embodiment of the invention, elements may be chosen according to some geometric patterns, for example covering only a certain spatial region of the video frame. In yet another embodiment of the invention, elements may be ordered according to their entropy, and the highest entropy elements are selected to form a word. Thus, the process of word formation is a projection from a $\phi$-dimensional space to a $\psi$-dimensional space, with $\psi \ll \phi$ preferably. For two video frames, the distance between two corresponding words, i.e. the bit pattern of ordered selected corresponding elements, is an approximation of the distance of the full frame descriptors.

All possible combinations of every possible value of the ordered elements that make up a word give the vocabulary for that word. Thus, a word is a unique combination of descriptor elements, and the vocabulary for a word is the set of different values the word can take. For example, if a word contains two descriptor elements, and each descriptor element is one bit long with each bit free to take the value 0 or 1, then the vocabulary for the word is 00, 01, 10 and 11.

In a preferred embodiment of the invention, a plurality of words is extracted from each frame, as illustrated in FIG. 2b, each word given from a small ordered set of elements in the binarised $\tilde{d}_i^1$. Preferably, the elements of each word are selected according to any suitable method, i.e. random projection, geometric constraints, entropy ordering, etc. Each word has a vocabulary, and the combination of bits which produces each word is unique, without excluding the possibility of partial overlaps, e.g. some elements appearing in more than one word. Furthermore, each word may or may not have the same length as any other word, i.e. we may have dimensionality reductions from $\phi$ to $\psi_1$, $\psi_2$, etc.

In alternative embodiments of the invention, words may be formed from any version of the descriptor $d_i$, be it at its original resolution and dynamic range, quantised or binarised. In such embodiments, an element may contribute more than one bit to a word, different numbers of bits to different words, and a word may contain different numbers of bits from different elements.

A video sequence is described by one or more of its frames, in the aforementioned manner. Then, we calculate the frequency of occurrence of the different words in each one of one or more vocabularies. More specifically, in a preferred embodiment of the invention, a plurality of frames in the sequence is processed, and from each frame $f_i$ a $\phi$-dimensional full descriptor and a plurality of words $w_{ik}$, $k \in [0, Q-1]$ each corresponding to one of Q vocabularies, is extracted. Then, for each vocabulary k, a histogram $h_k$ of the words found in the frame sequence is plotted. In simple terms, such a histogram shows which words appear in the frame sequence, and how often. More particularly, for each word, a histogram is generated having, on one axis, a respective bin for each value the word may take (that is, each value in the word's vocabulary) and recording, on the other axis, the number of occurrences of each value.

For two sequences of frames $f_i^1$ and $f_j^2$, their similarity can be assessed by comparing the histograms $h_k^1$ and $h_k^2$: for each vocabulary k and merging the results to reach a decision. This comparison may be achieved using a suitable distance measure, such as the histogram intersection. In a preferred embodiment of the invention, the histograms are binarised. Such binarised histograms then show the words with significant presence. The binarisation may be achieved by any one of a number of suitable ways, such as simple thresholding, adaptive thresholding, etc. For binarised histograms $\tilde{h}_k^1$ and $\tilde{h}_k^2$, their distance is preferably measured by the Jaccard distance measure given by $$D_k^J(\tilde{h}_k^1, \tilde{h}_k^2) = 1 - \frac{\tilde{h}_k^1 \cap \tilde{h}_k^2}{\tilde{h}_k^1 \cup \tilde{h}_k^2} \qquad (7)$$

In simple terms, eq. (7) measures the distance of the frame sequences $f_i^1$ and $f_j^2$ in a given vocabulary as a function of the distinct words they have in common and all the distinct words that they contain jointly.

For Q vocabularies, we have Q Jaccard distances $$D_0^J, D_1^J, \ldots, D_{Q-1}^J$$

In a preferred embodiment of the invention, these distances are fused to give the composite distance $$D^J$$

as $$D_J = \sum_{k=0}^{Q-1} D_k^J \qquad (8)$$

Then a decision on the similarity or not of the frame sequences may be reached by the processing of $$D^J,$$

preferably thresholding. In this case, the sequences would be declared matching if $$D^J$$

is less than some threshold, otherwise they would be declared not matching.

Clearly, many alternatives to eq. (8) exist, such as trimmed mean, median, max, etc. Furthermore, alternative embodiments may reach a decision on the similarity of the frame sequences not by distance fusion, but by decision fusion, i.e. by thresholding each $$D_k^J$$

individually, with the appropriate threshold, and then fusing the individual decisions, e.g. by majority voting. It is also possible, in an alternative embodiment of the invention, to combine distance fusion with decision fusion, i.e. reach a decision by calculating the composite $$D_J$$

and subsequent thresholding, but also require that a matching decision be supported by at least a set number of the individual $$D_J^k$$

distances.

Optionally, a detected match is verified by considering the temporal ordering of occurrence of the matching words in the video sequences for each vocabulary. In a preferred embodiment a set of words is found, for each vocabulary k, that occur in both video sequences $f_i^1$ and $f_j^2$. Preferably these are found by identifying elements that are non-zero in both histograms $h_k^1$ and $h_k^2$, i.e. the intersection of the binary histograms $\hat{h}_k^1$ and $\hat{h}_k^2$. Recalling that each element of each histogram corresponds to one word from the vocabulary, the intersection generates a set of words $W_k^{12} = \{w_{\lambda,k}, \lambda \in [0, z-1]\} = \{w_\alpha, K, w_\zeta\}$ with z elements that is common to both frames and is preferably ordered according to the vocabulary, e.g. numerically or alphabetically. Then, for each video sequence a set of frame numbers is generated $\Omega_k = \{\omega_{\lambda,k}, \lambda \in [0, z-1]\} = \{f_{60}, K, f_\zeta\}$, recording the first occurrence of the each of the words in the ordered set $W_k^{12}$.

The two sets of frame numbers $\Omega_k^1$ and $\Omega_k^2$, for $f_i^1$ and $f_j^2$; respectively, are compared to determine the distance between them. In the preferred embodiment $\Omega_k^1$ and $\Omega_k^2$ are binarised and the distance between them is given by the normalised Hamming distance. In a preferred embodiment the binarisation is performed as illustrated in FIG. 3 by evaluating differences between neighbouring elements of the set $$\tilde{\omega}_\lambda = \begin{cases} 0 & \omega_\lambda < \omega_{\lambda+1} \\ 1 & \text{otherwise.} \end{cases} \quad (9)$$

The binarised set is denoted $\tilde{\Omega}_k, \{\tilde{\omega}_{\lambda,k}, \lambda \in [0, z-1]\}$, and the normalised Hamming distance $$\overline{D}_H^\Omega.$$

In simple terms, such a binarised set records whether each word in the ordered set $W_k^{12}$ makes its first appearance in a video sequence before or after the next word in the ordered set of words $W_k^{12}$.

In alternative embodiments of the invention, $\Omega_k^1$ and $\Omega_k^2$ may be compared without binarisation using an appropriate distance measure, e.g. the L1, which would give the total number of frames by which the occurances of the words in one sequence differ from the other sequence.

For Q vocabularies, we have Q normalised Hamming distances $$\overline{D}_{0\,H}^\Omega, \overline{D}_{1\,H}^\Omega, \ldots, \overline{D}_{Q-1\,H}^\Omega.$$

In a preferred embodiment of the invention, these distances are fused to give the composite distance $$\overline{D}_H$$

as $$\overline{D}_H^\Omega = \sum_{k=0}^{Q-1} \overline{D}_{k\,H}^\Omega \quad (10)$$

Then a decision on the similarity or not of the frame sequences may be reached by the processing of $$\overline{D}_H^\Omega,$$

preferably thresholding. In this case, the sequences would be declared matching if $$\overline{D}_H^\Omega$$

is less than some threshold, otherwise they would be declared not matching.

Clearly, many alternatives to eq. (10) exist, such as trimmed mean, median, max, etc. Furthermore, alternative embodiments may reach a decision on the similarity of the frame sequences not by distance fusion, but by decision fusion, i.e. by thresholding each $$\overline{D}_{k\,H}^\Omega$$

individually, with the appropriate threshold, and then fusing the individual decisions, e.g. by majority voting. It is also possible, in an alternative embodiment of the invention, to combine distance fusion with decision fusion, i.e. reach a decision by calculating the composite $$\overline{D}_H^\Omega$$

and subsequent thresholding, but also require that a matching decision be supported by at least a set number of the individual $$\overline{D}_{k\,H}^\Omega$$

distances.

Figure 4:
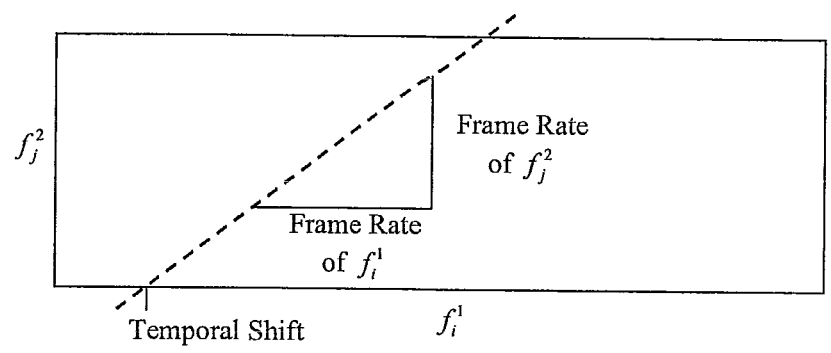
FIG. 4 illustrates the determination of time-shift and frame rate change in an embodiment.

Optionally, a further refinement and localisation stage is applied to decide to a very high level of accuracy whether the video sequences match and to determine corresponding frame locations in the two sequences. The set of matching words from both sequences is used to determine potential frame correspondences. The temporal variation between the sequences can then be estimated. In the preferred embodiment the time-shift and the frame rate difference between the sequences are found as illustrated in FIG. 4. Descriptors from a plurality of potentially corresponding frames can then be used to determine the validity of the correspondence and/or refine the temporal variation parameters.

More specifically, for each vocabulary k, each of the words in the intersection $W_k^{12} = \{w_{\lambda k}, \lambda \in [0, z-1]\} = \{w_\alpha, K, w_\zeta\}$ corresponds to one or more frames from each of the video sequences, where "one or more" may be a different number for each sequence, e.g. a word may be produced by only one frame in one sequence, and many frames in the second sequence. For a pair of video sequences, and for each vocabulary k, and for each of the z words in $W_k^{12}$ we construct a set that contains the frame number pairs in the sequences $f_i^1$ and $f_j^2$ which correspond to that word. So, if one of the z words in $W_k^{12}$ is generated by a single pair of frames in $f_i^1$ and $f_j^2$, the set for that word will contain only one pair of frame numbers. If another word is generated by multiple pairs of frames in $f_i^1$ and $f_j^2$ the set for that word will contain the same multiple number of pairs of frame numbers.

Then, for each word in $W_k^{12}$ and for each vocabulary k, the frame number pairs that correspond to that word are plotted in a single 2-dimensional histogram $G_{ij}^{12}$, $i \in [0, T_1-1]$, $j \in [0, T_2-1]$, where $T_1$ and $T_2$ are the numbers of frames in the sequences $f_i^1$ and $f_j^2$ respectively. In simple terms, in $G_{ij}^{12}$, a bin value of 0 denotes that the frame pair in question ie (i, j) did not produce a matching word in any of the Q vocabularies, a bin value of k<Q denotes that the frame pair in question produced a matching word only in k of Q vocabularies, and a bin value of Q denotes that the frame pair in question produced a matching word in all Q vocabularies.

Frames in $f_i^1$ and $f_j^2$ are deemed to be corresponding if they have the same word in one or more vocabularies, and this may be seen as a weak test of correspondence i.e. they are weakly corresponding. For each of the weakly corresponding pairs of frames a stronger test of correspondence is carried out by comparing them according to a more detailed descriptor. Preferably, the binary descriptors $\tilde{d}_i^1$ and $\tilde{d}_j^2$ are used, extracted from $f_i^1$ and $f_j^2$ as described earlier. The distance between such binary descriptors is preferably calculated as the Hamming distance $$D_H^{\tilde{d}}.$$

In alternative embodiments of the invention, any version of the descriptor d as described in eq. (1)-(4) may be used, or appropriate subsets of this descriptor, be it at its original resolution and dynamic range, quantised or binarised, and the Hamming distance $$D_H^{\tilde{d}}$$

replaced by the appropriate distance measure, e.g. L1.

To beneficially reduce processing time when a large number of weakly corresponding frame pairs exists, only a limited number of them may be confirmed as strongly corresponding frame pairs. Preferably the pairs are examined in order of most common words. That is pairs with Q common words are examined first, then pairs with Q-1 common words and so on. This type of ordering according to the number of common words is readily provided by the 2D histogram $G_{ij}^{12}$. A weakly corresponding frame pair is accepted as a strongly corresponding frame pair if the distance between the frame descriptors meets certain criteria, i.e. preferably it is below a predefined threshold. This is repeated until there are no remaining weakly corresponding pairs or a certain number of strongly corresponding pairs has been found. From the above it follows that frame pairs with fewer than Q or even just 1 matching word may be confirmed as strongly corresponding frame pairs, while frame pairs with Q matching words in Q vocabularies may be not be confirmed as strongly corresponding frame pairs, because of poor similarity according to their detailed descriptors. Thus, in general, a larger number of weakly corresponding frame pairs is reduced to a smaller number of strongly corresponding frame pairs.

The strongly corresponding pairs are then used to estimate the temporal parameter change between the frame sequences. In a preferred embodiment the temporal parameters are time-shift and frame-rate change. These are linear properties and can therefore be estimated using two strongly-corresponding pairs. Preferably a Hough transform is used to estimate the temporal parameters. The peaks in the Hough space correspond to the most likely temporal parameters. The Hough transform and the Radon transform are not examined here, but are expertly described in van Ginkel, M., Hendriks, C. L., van Vliet, L. J., "A short introduction to the Radon and Hough transforms and how they relate to each other", Number QI-2004-01 in the Quantitative Imaging Group Technical Report Series, Delft University of Technology.

The Hough transform is typically used to give a coarse estimate of the parameters. Using these parameters frame correspondences are established between two video sequences. In a preferred embodiment the frame correspondences can be more accurately determined. A single descriptor provides a certain level of accuracy, by combining a plurality of descriptors a higher level of accuracy is achieved. In a preferred embodiment the Hamming distance between descriptors is used and the Hamming distances are then added together across the descriptors. Preferably a plurality of corresponding frames from two sequences are chosen and the distance between the sequences are found by examining the distances between the combination of descriptors from the frames. In a preferred embodiment a group of (for example 7) consecutive frames are chosen from the start of a first sequence and are compared with the corresponding frames from the second sequence. Alternatively, the frames may be from different parts of the sequence (middle, end, etc) and/or the frames may be non-consecutive. In a preferred embodiment, frame correspondences are refined by keeping one frame of the corresponding pair stable, and searching in the locality of its corresponding frame for a better corresponding frame.

In an embodiment, an efficient descriptor storage scheme is used to form a compact representation of a video sequence. In the preferred embodiment the sequence is divided into fragments of, say, 1 second. For each fragment, Q binary histograms $\tilde{h}_k$ are stored in a bitstream. Following the binary histogram the descriptors $\tilde{d}_i$ for each of the frames in the fragment are stored. All fragments in the sequence are stored consecutively in the bitstream in this manner. Optionally information can be stored at the head of the bitstream such as the frame rate of the sequence, the number of frames, the number of fragments etc.

In an alternative embodiment the sequence can be represented in the bitstream by a plurality of frame representations.

Where each frame is represented by Q words and a binary descriptor $\underline{d}_i$. All of the frames in the sequence can be stored in this manner. In another alternative it may be desirable to store all of the words in from all of the frames first followed by all of the descriptors. Clearly it is possible to store the quantised or original versions of the histograms, words and descriptors.

In an alternative embodiment of the invention, the descriptor extracted from the video frames may be changed to a suitable frame descriptor, e.g. a colour histogram or edge strength histogram, which may be stored in its original, quantised or binarised forms, and from which words may be formed. In different embodiments of the invention, different decision stages may be omitted. For example, the processing and decision stage based on the temporal ordering of occurrence of the matching words in the video sequences for each vocabulary may be entirely omitted, with processing proceeding directly to the stage of refinement, localisation and determination of corresponding frames. In alternative embodiments of the invention, the decision stage according to the matching words found in each video sequence may be omitted, and processing may proceed directly to the processing and decision stage based on the temporal ordering of occurrence of the matching words in the video sequences.

Figure 5:
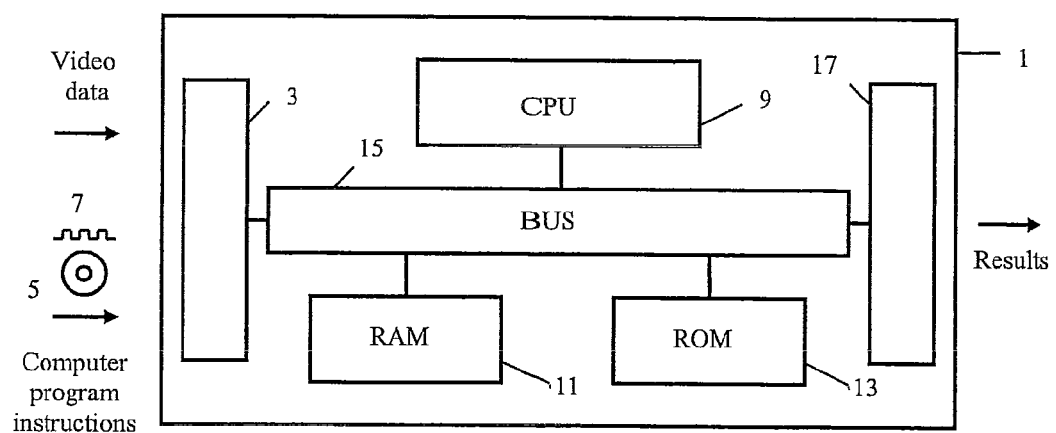
FIG. 5 shows an example of a processing apparatus for performing the processing operations of an embodiment.

A data processing apparatus 1 for performing the processing operations described above is shown in FIG. 5. The apparatus 1 can, for example, be a personal desktop computer or a portable computer.

The apparatus 1 comprises conventional elements of a data processing apparatus, which are well-known to the skilled person, such that a detailed description is not necessary. In brief, the apparatus 1 of FIG. 5 comprises an input data interface 3 for receiving computer program instructions from a computer program product such as a storage medium 5 or a signal 7, as well as video data to be processed. A processing system is provided, for example, by a CPU 9, a random access memory 11, and a read-only memory 13, which are connected by a bus 15. The CPU 9 controls the overall operation. The RAM 11 is a working memory used by the CPU 9 to execute programs and control the ROM 4, which stores the programs and other data. The processing apparatus of apparatus 1 is configured to perform a method of processing image data defining an image as described herein above. The results of this processing are output by output interface 17.

Although the processing apparatus 1 described above performs processing in accordance with computer program instructions, an alternative processing apparatus can be implemented in any suitable or desirable way, as hardware, software or any suitable combination of hardware and software. It is furthermore noted that the present invention can also be embodied as a computer program that executes one of the above-described methods of processing image data when loaded into and run on a programmable processing apparatus, and as a computer program product, e.g. a data carrier storing such a computer program.

The foregoing description of embodiments of the invention has been presented for the purpose of illustration and description. It is not intended to be exhaustive or to limit the invention to the precise form disclosed. Alternations, modifications and variations can be made without departing from the spirit and scope of the present invention.

The invention claimed is:

1. A method of processing a first sequence of images and a second sequence of images with a physical computing device to compare the first and second sequences, the method comprising the physical computing device:

(a) processing each of a plurality of the images in the first sequence and each of a plurality of the images in the second sequence by:
 processing the image data for each of a plurality of pixel neighborhoods in the image to generate at least one respective descriptor element for each of the pixel neighborhoods, each descriptor element comprising one or more bits; and
 forming a plurality of words from the descriptor elements of the image such that each word comprises a unique combination of descriptor element bits;
 wherein the words for the second sequence are generated from the same respective combinations of descriptor element bits as the words for the first sequence; and
(b) performing processing to compare the first and second sequences by comparing the words generated for the plurality of images in the first sequences with the words generated for the plurality of images in the second sequence.

2. A method according to claim 1, wherein the processing by the physical computing device to compare the first and second sequences comprises processing to compare the frequency of occurrence of different word values in the first and second sequences.

3. A method according to claim 1, wherein the processing to compare the first and second sequences comprises the physical computing device:
 determining the number of occurrences of each possible word value for each word in the first sequence to generate occurrence data for the first sequence;
 determining the number of occurrences of each possible word value for each word in the second sequence to generate occurrence data for the second sequence; and
 comparing the occurrence data for the first sequence with the occurrence data for the second sequence.

4. A method according to claim 3, wherein the occurrence data for the first sequence and the occurrence data for the second sequence are compared by the physical computing device to generate a respective comparison result for each word, and the respective comparison results are merged by the physical computing device to generate an overall comparison result.

5. A method according to claim 1, further comprising the physical computing device:
 determining, for each word, the word values that occur in both sequences;
 determining, for each word, the temporal order of occurrence of the word values in both sequences; and
 comparing the temporal orders of occurrence.

6. A method according to claim 1, further comprising the physical computing device:
 identifying matching pairs of images, each pair of images comprising an image from the first sequence and an image from the second sequence; and
 performing a further correspondence test to determine a similarity between at least one identified pair of images.

7. A method of processing image data defining an image with a physical computing device to generate at least one value representative of the image, the method comprising the physical computing device:
 resampling the image to m×m pixel resolution;
 processing the resampled image data for each of a plurality of pixel neighborhoods in the resampled image to generate at least one respective descriptor element for each of the pixel neighborhoods, each descriptor element being generated by using luminance information of the resampled image and comprising one or more bits; and forming at least one word from the descriptor elements such that each word comprises one or more bits from one or more descriptor elements and such that the total number of bits in all of the words is less than the total number of bits in all of the descriptor elements.

8. A method of processing image data defining an image with a physical computing device to generate a plurality of values representative of the image, the method comprising the physical computing device:

resampling the image to m×m pixel resolution;

processing the resampled image data for each of a plurality of pixel neighborhoods in the resampled image to generate at least one respective descriptor element for each of the pixel neighborhoods, each descriptor element being generated by using luminance information of the resampled image and comprising one or more bits; and forming a plurality of words from the descriptor elements such that each word comprises a unique combination of descriptor element bits.

9. A method according to claim 7 or claim 8, wherein:

the method further comprises the physical computing device quantizing each descriptor element; and each word is formed by the physical computing device from the quantized descriptor elements.

10. A method according to claim 9, wherein the process of quantizing each descriptor element comprises the physical computing device quantizing each descriptor element to form a respective one bit binary result.

11. A method according to claim 7 or claim 8, wherein:

descriptor elements are generated by the physical computing device for the image at a plurality of different pixel resolutions; and at least one word is generated by the physical computing device by combining one or more bits from descriptor elements generated at different pixel resolutions.

12. A method of processing image data defining a sequence of images with a physical computing device to generate and store a representation of the sequence, the method comprising the physical computing device:

resampling the image to m×m pixel resolution;

processing the resampled image data for each of a plurality of pixel neighborhoods in the resampled image to generate at least one respective descriptor element for each of the pixel neighborhoods, each descriptor element being generated by using luminance information of the resampled image and comprising one or more bits; and forming at least one word from the descriptor elements such that each word comprises one or more bits from one or more descriptor elements and such that the total number of bits in all of the words is less than the total number of bits in all of the descriptor elements generating histogram data defining which words appear in the sequence of images and how often; and storing the histogram data, words and descriptor elements for the images in the sequence.

13. A method according to claim 12, wherein:

the method further comprises the physical computing device quantizing each descriptor element;

the physical computing device forms each word from the quantized descriptor elements;

the method further comprises the physical computing device quantizing the histogram data, and the physical computing device stores the quantized histogram data, words and quantized descriptor elements.

14. A method according to claim 12, wherein the sequence of images comprise a fragment of a video sequence.

15. A method according to claim 12, wherein the physical computing device stores the histogram data, words and descriptor elements in the bitstream.

16. A method of processing image data defining a sequence of images with a physical computing device to generate and store a representation of the sequence, the method comprising the physical computing device:

resampling the image to m×m pixel resolution;

processing the resampled image data for each of a plurality of pixel neighborhoods in the resampled image to generate at least one respective descriptor element for each of the pixel neighborhoods, each descriptor element being generated by using luminance information of the resampled image and comprising one or more bits; and forming a plurality of words from the descriptor elements such that each word comprises a unique combination of descriptor element bits generating histogram data defining which words appear in the sequence of images and how often; and storing the histogram data, words and descriptor elements for the images in the sequence.

17. A method according to claim 16, wherein:

the method further comprises the physical computing device quantizing each descriptor element;

the physical computing device forming each word from the quantized descriptor elements;

the method further comprises the physical computing device quantizing the histogram data, and the physical computing device storing the quantized histogram data, words and quantized descriptor elements.

18. A method according to claim 16, wherein the sequence of images comprise a fragment of a video sequence.

19. A method according to claim 16, wherein the physical computing device stores the histogram data, words and descriptor elements in the bitstream.

20. An apparatus operable to process a first sequence of images and a second sequence of images to compare the first and second sequences, the apparatus comprising:

a descriptor element generator operable to process each of a plurality of the images in the first sequence and each of a plurality of the images in the second sequence by processing the image data for each of a plurality of pixel neighborhoods in the image to generate at least one respective descriptor element for each of the pixel neighborhoods, each descriptor element comprising one or more bits;

a word generator operable to generate a plurality of words from the descriptor elements of each image such that each word comprises a unique combination of descriptor element bits, wherein the word generator is arranged to generate the words for the second sequence from the same respective combinations of descriptor element bits as the words for the first sequence; and a word comparer operable to compare the first and second sequences by comparing the words generated for the plurality of images in the first sequences with the words generated for the plurality of images in the second sequence.

21. An apparatus operable to process image data defining an image to generate at least one value representative of the image, the apparatus comprising:

a resampler that resamples the image to m×m pixel resolution;

a descriptor element generator operable to process the resampled image data for each of a plurality of pixel neighborhoods in the resampled image to generate at least one respective descriptor element for each of the pixel neighborhoods, each descriptor element being generated by using luminance information of the resampled image and comprising one or more bits; and a word generator operable to generate at least one word from the descriptor elements such that each word comprises one or more bits from one or more descriptor elements and such that the total number of bits in all of the words is less than the total number of bits in all of the descriptor elements.

22. An apparatus operable to process image data defining an image to generate a plurality of values representative of the image, the apparatus comprising:

a resampler that resamples the image to m×m pixel resolution;

a descriptor element generator operable to process the resampled image data for each of a plurality of pixel neighborhoods in the resampled image to generate at least one respective descriptor element for each of the pixel neighborhoods, each descriptor element being generated by using luminance information of the resampled image and comprising one or more bits; and a word generator operable to generate a plurality of words from the descriptor elements such that each word comprises a unique combination of descriptor element bits.

23. An apparatus operable to process image data defining a sequence of images to generate and store a representation of the sequence, the apparatus comprising:

a resampler that resamples the image to m×m pixel resolution;

a descriptor element generator operable to process, for each resampled image in the sequence, the image data for each of a plurality of pixel neighborhoods in the resampled image to generate at least one respective descriptor element for each of the pixel neighborhoods, each descriptor element being generated by using luminance information of the resampled image and comprising one or more bits;

a word generator operable to generate, for each image in the sequence, at least one word from the descriptor elements of the image such that each word comprises one or more bits from one or more descriptor elements and such that the total number of bits in all of the words of the image is less than the total number of bits in all of the descriptor elements of the image;

a histogram generator operable to generate histogram data defining which words appear in the sequence of images and how many times; and a data writer operable to write the histogram data, words and descriptor elements for the images in the sequence to storage.

24. An apparatus operable to process image data defining a sequence of images to generate and store a representation of the sequence, the apparatus comprising:

a resampler that resamples the image to m×m pixel resolution;

a descriptor element generator operable to process, for each resampled image in the sequence, the image data for each of a plurality of pixel neighborhoods in the resampled image to generate at least one respective descriptor element for each of the pixel neighborhoods, each descriptor element being generated by using luminance information of the resampled image and comprising one or more bits;

a word generator operable to generate, for each image in the sequence, a plurality of words from the descriptor elements of the image such that each word comprises a unique combination of descriptor element bits;

a histogram generator operable to generate histogram data defining which words appear in the sequence of images and how many times; and a data writer operable to write the histogram data, words and descriptor elements for the images in the sequence to storage.

25. A non-transitory computer-readable medium having computer-readable instructions stored thereon that, if executed by a computer, cause the computer to perform processing operations comprising:

(a) processing each of a plurality of images in a first sequence and each of a plurality of images in a second sequence by:

processing the image data for each of a plurality of pixel neighborhoods in the image to generate at least one respective descriptor element for each of the pixel neighborhoods, each descriptor element comprising one or more bits; and forming a plurality of words from the descriptor elements of the image such that each word comprises a unique combination of descriptor element bits;

wherein the words for the second sequence are generated from the same respective combinations of descriptor element bits as the words for the first sequence; and (b) performing processing to compare the first and second sequences by comparing the words generated for the plurality of frames in the first sequences with the words generated for the plurality of frames in the second sequence.

26. A non-transitory computer-readable medium having computer-readable instructions stored thereon that, if executed by a computer, cause the computer to perform processing operations comprising:

resampling the image to m×m pixel resolution;

processing the resampled image data for each of a plurality of pixel neighborhoods in the resampled image to generate at least one respective descriptor element for each of the pixel neighborhoods, each descriptor element being generated by using luminance information of the resampled image and comprising one or more bits; and forming at least one word from the descriptor elements such that each word comprises one or more bits from one or more descriptor elements and such that the total number of bits in all of the words is less than the total number of bits in all of the descriptor elements.

27. A non-transitory computer-readable medium having computer-readable instructions stored thereon that, if executed by a computer, cause the computer to perform processing operations comprising:

resampling the image to m×m pixel resolution;

processing the resampled image data for each of a plurality of pixel neighborhoods in the resampled image to generate at least one respective descriptor element for each of the pixel neighborhoods, each descriptor element being generated by using luminance information of the resampled image and comprising one or more bits; and forming a plurality of words from the descriptor elements such that each word comprises a unique combination of descriptor element bits.

28. A non-transitory computer-readable medium having computer-readable instructions stored thereon that, if executed by a computer, cause the computer to perform processing operations comprising:

for each image in a sequence of images:
resampling the image to m×m pixel resolution;
processing the resampled image data for each of a plurality of pixel neighborhoods in the resampled image to generate at least one respective descriptor element for each of the pixel neighborhoods, each descriptor element being generated by using luminance information of the resampled image and comprising one or more bits; and
forming at least one word from the descriptor elements such that each word comprises one or more bits from one or more descriptor elements and such that the total number of bits in all of the words is less than the total number of bits in all of the descriptor elements;
generating histogram data defining which words appear in the sequence of images and how often; and
storing the histogram data, words and descriptor elements for the images in the sequence.

29. A non-transitory computer-readable medium having computer-readable instructions stored thereon that, if executed by a computer, cause the computer to perform processing operations comprising:
for each image in a sequence of images:
resampling the image to m×m pixel resolution
processing the resampled image data for each of a plurality of pixel neighborhoods in the resampled image to generate at least one respective descriptor element for each of the pixel neighborhoods, each descriptor element being generated by using luminance information of the resampled image and comprising one or more bits; and
forming a plurality of words from the descriptor elements such that each word comprises a unique combination of descriptor element bits;
generating histogram data defining which words appear in the sequence of images and how often; and
storing the histogram data, words and descriptor elements for the images in the sequence.

* * * * *